United States Patent [19]

Spector

[11] E Re. 30,103

[45] Reissued Sep. 25, 1979

[54] INFLATABLE, CHEMI-LUMINESCENT ASSEMBLY

[76] Inventor: Donald Spector, 380 Mountain Rd., Union City, N.J. 07087

[21] Appl. No.: 912,074

[22] Filed: Jun. 5, 1978

Related U.S. Patent Documents

Reissue of:

[64] Patent No.: 4,015,111
Issued: Mar. 29, 1977
Appl. No.: 605,809
Filed: Aug. 19, 1975

[51] Int. Cl.[2] ..... A63B 43/06; F21V 9/16; F21V 3/02; F21V 17/04; F21L 7/00; F21L 15/00; F21L 25/00

[52] U.S. Cl. ..... 362/34; 9/8.3 R; 9/8.3 E; 46/226; 46/228; 46/88; 46/90; 273/58 B; 273/58 G; 362/84; 362/186; 362/189; 362/311; 362/352; 362/362; 362/363; 362/450; 362/806; 362/809

[58] Field of Search ..... 362/34, 84, 189, 363, 362/450, 809, 351, 352, 362, 806, 184, 186, 311; 46/226, 228, 87, 88, 90; 273/58 R, 58 B, 58 G, DIG. 24; 9/8.3 R, 8.3 E

[56] References Cited

U.S. PATENT DOCUMENTS

| | | | |
|---|---|---|---|
| 1,447,589 | 3/1923 | Leech et al. | 362/84 |
| 1,826,221 | 10/1931 | Pearson | 273/58 B |
| 1,858,991 | 5/1932 | Frost | 362/806 |
| 1,912,960 | 6/1933 | Aki et al. | 362/809 |
| 2,078,707 | 4/1937 | Braunschweig | 362/362 |
| 2,213,868 | 9/1940 | Lucian | 240/2.25 X |
| 2,871,343 | 1/1959 | Whitney | 362/363 |
| 2,936,366 | 5/1960 | Rainford | 362/363 |
| 3,229,976 | 1/1966 | Allen, Jr. | 273/58 B |
| 3,539,794 | 11/1970 | Rauhut et al. | 362/34 |
| 3,578,962 | 5/1971 | Gerber | 362/34 |
| 3,755,820 | 9/1973 | Petrusek | 273/58 B |
| 3,774,022 | 11/1973 | Dubrow et al. | 362/34 |
| 3,800,132 | 3/1974 | Postal | 362/34 |
| 3,875,602 | 4/1975 | Miron | 362/34 |

FOREIGN PATENT DOCUMENTS

| | | | |
|---|---|---|---|
| 461218 | 6/1928 | Fed. Rep. of Germany | 362/806 |
| 411175 | 6/1910 | France | 362/351 |

*Primary Examiner*—Benjamin R. Padgett
*Assistant Examiner*—T. S. Gron

[57] ABSTRACT

A globular chemical-lighting assembly suitable as an illuminated playing ball or as an omnidirectional light-emitting source. The assembly is constituted by a compact chemi-luminescent device which is insertable within an inflatable globe formed of translucent material to occupy a central position therein, the globe acting to uniformly diffuse the light emitted by the device. The chemi-luminescent device is formed by two separate chambers in side-by-side relation, each containing one component of a two-component chemi-luminescent system and a manually-operated activator interconnecting these chambers to intermingle the components and thereby cause a light-producing reaction, the device normally being in a non-reactive state.

12 Claims, 5 Drawing Figures

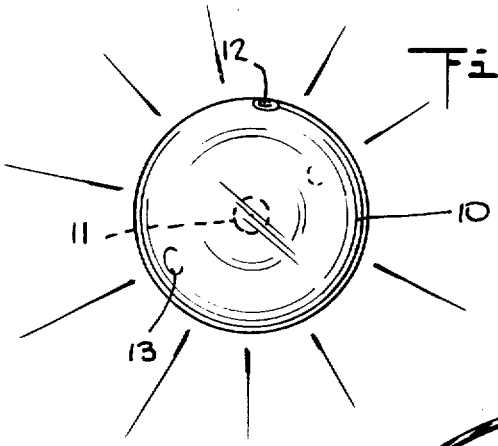
Fig. 1.
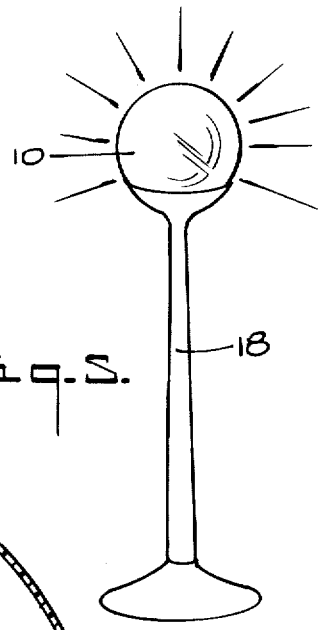
Fig. 5.
Fig. 2.
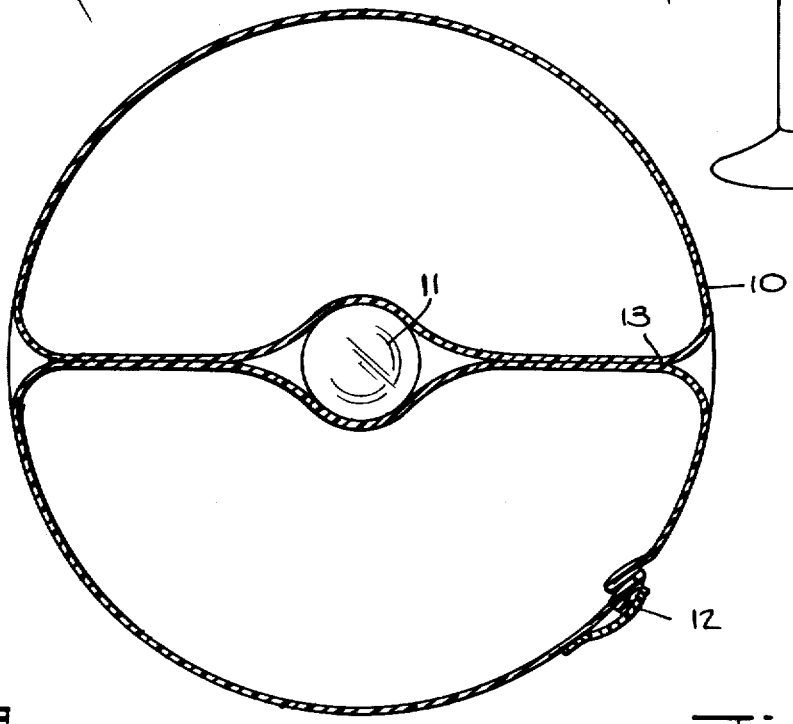
Fig. 3.
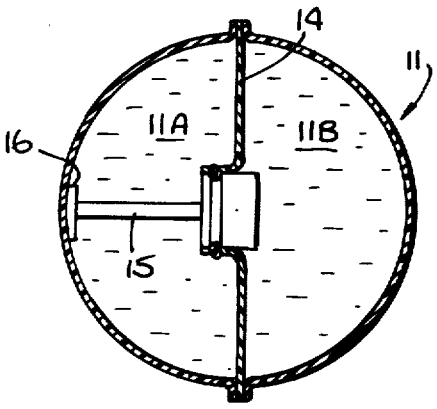
Fig. 4.
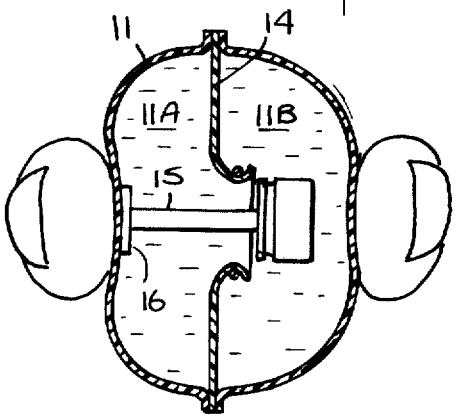

INFLATABLE, CHEMI-LUMINESCENT ASSEMBLY

Matter enclosed in heavy brackets [ ] appears in the original patent but forms no part of this reissue specification; matter printed in italics indicates the additions made by reissue.

BACKGROUND OF INVENTION

This invention relates generally to the field of chemical light generators, and more particularly to an inflatable ball or globe of translucent material adapted to incorporate a replaceable, compact chemi-luminescent device.

In the modern world, artificial light sources are largely of the electrically-activated type, use being made of incandescent light bulbs, fluorescent tubes and other types of electrically-energized light emitters. The necessary electrical power for such emitters is derived from power lines, motor-generators and batteries. There are, however, circumstances where it is desirable to provide a source of visible light which is not electrically activated. Thus in emergency situations where there is no electrical power available or where there has been an electrical power failure, alternative light sources are required.

The use of chemi-luminescent devices as an alternative to an electrically-activated light source is well-known. Such devices incorporate chemical components which react to provide excitation for a fluorescent compound. With a chemi-luminescent device, once the reaction is initiated, it runs its course and it is not possible to turn the light on and off at will. It is therefore the present practice to maintain the reactive components in a non-reactive state until the need for light arises.

Thus in U.S. Pat. No. 3,576,987, a chemi-luminescent device is disclosed which is constituted by an outer flexible tube of translucent material having concentrically-disposed therein an inner rigid tube, the rigid tube being breakable. The sealed inner tube is filled with one component of a two-component chemical lighting system, and the sealed outer tube is filled with the second component thereof.

To activate this known device, the flexible outer tube is bent to an extent causing fracture of the inner tube, as a result of which the two components intermingle to initiate the generation of light. Chemi-luminescent light is obtained by the reaction of hydroperoxide with a chemi-luminescent composition. In this way, the outer tube becomes a light wand or stick which may be held in the hand or placed at a suitable site.

A chemi-luminescent light wand of the above-described type has many practical advantages, for it can be made small and highly-portable. And since it radiates a cold light, it is useful in situations where the heat generated by electrically-activated light sources is undesirable or hazardous. It is also useful under conditions where an electrical system may represent a fire hazard such as in the presence of flammable agents, or underwater where a danger of electrical shorting exists.

The main drawback of a chemical light source in stick form is that it constitutes a highly-directional light emitter, and unless properly oriented, it functions inefficiently. To give a simple analogy: The sun is a spherical generator which emits light rays omnidirectionally and efficiently illuminates all planets within the planetary system without regard to their position with respect to the sun. But had the sun been in stick form, the planets in line with the end of the stick would receive little light, while others at different locations would be more or less illuminated, depending on their angular positions relative to the stick. Thus while the ideal light radiator is a globe, existing types of chemi-luminescent devices fall far short of this ideal.

SUMMARY OF INVENTION

In view of the foregoing, it is the main object of this invention to provide a globular light-emitting assembly incorporating a replaceable chemi-luminescent device, the assembly functioning to radiate cold light omnidirectionally.

More particularly, it is an object of this invention to provide an assembly of the above type in which the chemi-luminescent device is insertable within an inflatable globe formed of translucent material, the device occupying a central position therein.

Also an object of this invention is to provide an improved form of multi-chamber chemi-luminescent device which lends itself to insertion within an inflatable globe.

The globular assembly in accordance with the invention has many practical uses not limited to emergency situations requiring illumination. Thus by mounting the inflatable globe on a raised standard, it may then serve as an attractive outdoor lantern for garden parties and other festive occasions, particularly since the chemi-luminescent device incorporated therein is effective for several hours.

Or the inflated globe may be used as a bouncing ball for play at night, for not only is the ball highly visible under poor ambient light conditions, but the liquid-filled chemi-luminescent device therein has a stabilizing influence on the air-filled globe and lends body thereto, so that the playing characteristics of the globular assembly are distinctly superior to those of ordinary inflatable balls.

The light-emitting inflatable globe is, of course, usable in all emergency situations calling for light. Its omnidirectional radiating characteristics not only afford improved illumination, but the globe also provides a more effective S-O-S signal than a directional light stick. Thus in a life boat, the illuminated ball may be tied to or mounted above a pole, the resultant omnidirectional signal being visible in all directions. Moreover, the inflated light-producing globe will float on water, which opens up many other useful emergency as well as play possibilities.

Briefly stated, these objects are accomplished in a globular chemical lighting assembly constituted by an inflatable globe and a spherically-shaped chemi-luminescent device insertable therein. The device is formed by two separate semi-circular chambers in side-by-side relation, each containing one liquid component of a two-component chemi-luminescent system, and a manually-operated activator to interconnect the chambers to intermingle the components and thereby cause a light-producing reaction, the device being normally in the non-reactive state.

The inflatable globe is formed of translucent flexible material which may have a light-diffusing surface or a fluorescent layer thereon, the globe including a cylindrical duct of flexible material extending diametrically therethrough, the diameter of the duct substantially corresponding to that of the spherical device, whereby the device may first be activated and then inserted into the duct to occupy a central position therein, after which the globe is inflated, the duct being collapsed by internal pressure to lock the device within the globe.

OUTLINE OF DRAWING

For a better understanding of the invention as well as other objects and further features thereof, reference is made to the following detailed description to be read in conjunction with the accompanying drawing, wherein:

FIG. 1 is a perspective view of a chemical-lighting assembly in accordance with the invention;

FIG. 2 is a section taken through the central plane of the assembly shown in FIG. 1;

FIG. 3 is a separate view, in section, of the spherical chemi-luminescent device inserted in the assembly, the device being shown in its inactive state;

FIG. 4 shows the chemi-luminescent device in its active state; and

FIG. 5 shows one manner of mounting the assembly.

DESCRIPTION OF INVENTION

The Assembly

Referring now to FIGS. 1 and 2, there is shown an inflatable chemical lighting assembly in accordance with the invention. The assembly consists of an inflatable globe, generally designated by numeral 10, and a spherically-shaped chemi-luminescent device 11 held centrally therein.

Globe 10 is fabricated of transparent flexible plastic material of high strength, such as polyvinyl chloride, polyethylene or polypropylene film. The globe is provided with a suitable valve 12 of the type used, for example, in conventional inflatable balls. The valve is preferably the type provided with retractable mouthpiece so that the globe can be inflated in balloon fashion by mouth without the need for a pump which may not be available in emergency situations. The globe may be in any desired diameter, and in some cases, such as where the assembly is intended for decorative lighting purposes, it may be very large, whereas when it is intended as a playing ball, a standard ball diameter is used.

In practice, to impart light-diffusing properties to the globe while at the same time concealing the device held therein, the inner surface may be sanded, roughened or otherwise treated to disperse light. Alternatively the inner surface may be coated with a translucent layer of fluorescent material which is excited by the light rays emitted by the device. Or use may be made of a transparent plastic material in various hues or color patterns so that the light is radiated in colors other than that produced by the chemi-luminescent device.

Extending diametrically through the globe is an open-ended cylindrical duct 13 formed of the same flexible transparent material as the globe itself or of similar material. The duct, therefore, is open to the atmosphere, whereas the globe is hermetically sealed. The diameter of duct 13 is about the same as that of the chemi-luminescent device so that the device may easily be inserted therein, when the globe is in the deflated state, to occupy a central position in the globe.

When the globe is thereafter inflated to a level above atmospheric pressure, the internal globe pressure acts to collapse duct 13 except that region thereof containing the chemi-luminescent device which is now trapped within the duct. The collapsed sections of the duct on either side of the device now act as flattened straps to hold the trapped device in place.

Alternatively, instead of a duct, one may provide in the globe a test-tube shaped receptacle of flexible material adapted to receive the device, the tube being held in place by bands secured to the inner wall of the globe.

The Chemi-Luminescent Device

As shown in FIGS. 2 and 4, device 11 is constituted by a spherical ball formed of relatively rigid but deformable transparent plastic material, the ball being divided by a penetrable membrane 14 into two hemispherical chambers 11A and 11B. Associated with membrane 14 is an activator 15 in the form of a stem, pushably mounted on the membrane at right angles thereto and provided with a knife edge. The other end of the stem terminates in a button 16 which may be pressed inwardly by squeezing the ball, thereby causing the knife edge to rupture the membrane so that the chambers then communicate with each other.

The ball may be protectively enclosed in a transparent sheath of flexible material. Chamber 11A is filled with one component of a two-component chemi-luminescent system, and chamber 11B is filled with the other component thereof. These components may be of the type disclosed in U.S. Pat. Nos. 3,576,987 and 3,597,362. When, therefore, the activator 15 is operated to rupture the membrane, as shown in FIG. 4, the separated components then intermingle to initiate the generation of light.

Thus the device is normally inactive, the device being activated just before it is placed within the duct of the deflated globe. After inflation, the light-emitting device, which is held centrally within the globe, radiates light in all directions, these rays being diffused by the globe.

While a spherically-shaped chemi-luminescent device is preferred, it will be appreciated that existing types of chemi-luminescent sticks may also be inserted in the duct and trapped therein. While such sticks radiate directionally, the diffusing globe brings about a light distribution, as a result of which the globe appears to be more or less uniformly excited to provide illumination in all directions.

Instead of an activator which ruptures a membrane as disclosed above, the two hemispherical chambers may be interconnected by a short tube having a barrier therein which is ruptured by twisting one chamber relative to the other.

Applications

As noted previously, the illuminated globe may be used in a playing ball at night or it may be used as an emergency or decorative light source. Thus as shown in FIG. 5, the globe may be rested in the cup-shaped headpiece of a pole 18 to provide outdoor illumination. For higher levels of illumination, the globe may be designed to receive more than one chemi-luminescent device.

While there has been shown and described a preferred embodiment of an inflatable chemi-luminescent assembly in accordance with the invention, it will be appreciated that many changes and modifications may be made therein without, however, departing from the essential spirit thereof. Thus it is not essential that the globe have a perfectly spherical form as shown, for other geometric forms may be used, such as the oblate form popular in Japanese lanterns. It is also possible to provide multi-lobe inflatable globes, each lobe being adapted to receive a chemi-luminescent device. The term globe as used herein is intended to encompass the full range of such shapes.

It is also possible to dispense with an actuator stem and merely provide a fragile membrane which ruptures when the ball-shaped device is squeezed to apply differential pressure to the membrane.

One may also replace the chemi-luminescent device with a battery-operated device, preferably in spherical form with light bulbs at diametrically-opposed positions.

I claim:

1. A globular chemical lighting assembly comprising:

A. a chemi-luminescent device *having predetermined dimensions* constituted by two separate chambers each containing one component of a two-component chemi-luminescent system and activating means to interconnect said chambers to intermingle said components and thereby cause a light-producing reaction, whereby said device is normally in a non-reactive state; and B. an inflatable globe *whose diameter is substantially greater than the longest dimensions of said device* formed of translucent material and including conduit means communicating with the exterior of the globe adapted to receive said device and to hold it at a central position within the globe when the globe is inflated, whereby by first activating the device and then inserting it in the conduit means, the globe then functions as a globular light emitter, said conduit means being constituted by an open-ended tubular duct extending diametrically through said globe and formed of collapsible flexible material which when the globe is inflated to a level above atmospheric pressure is caused to collapse except the region therein enveloping said device which is now trapped within the duct, the collapsed portion of the duct on either side of the trapped device acting as flattened straps to hold the device in place, *the device internally trapped in said globe being in non-projecting relationship thereto whereby the assembly is operable as a ball.*

2. An assembly as set forth in claim 1 wherein said globe is formed of flexible plastic film.

3. An assembly as set forth in claim 1 wherein the inner surface of said globe has light dispersing properties.

4. An assembly as set forth in claim 1 wherein the unit surface of said globe has a fluorescent layer thereon.

5. An assembly as set forth in claim 1 wherein the chambers of said device have a hemispheric form to define a spherical device.

6. An assembly as set forth in claim 5 wherein said chambers have a common membrane which is ruptured by said activating means.

7. An assembly as set forth in claim 6 wherein said activating means is formed by a stem pushably mounted on said membrane at right angles thereto and provided with a knife edge to rupture said membrane.

8. An assembly as set forth in claim 1 wherein said globe includes a valve having a mouthpiece to facilitate inflation therein.

9. An assembly as set forth in claim 1 wherein said globe is spherical in form.

10. An assembly as set forth in claim 1 wherein said globe has a circular cross-section and the diameter of said globe renders said assembly suitable as a playing ball.

*11. A globular assembly comprising:*

*A. a battery operated illuminating device having predetermined dimensions; and*

*B. an inflatable globe whose diameter is substantially greater than the longest dimensions of said device formed of translucent material and including conduit means communicating with the exterior of the globe and adapted to receive said device and to hold it at a central position within the globe when the globe is inflated, said conduit means being constituted by an open-ended tubular duct extending diametrically through said globe and formed of collapsible flexible material which, when the globe is inflated to a level above atmospheric pressure, is caused to collapse, except the region therein enveloping said device which is now trapped within the duct, the collapsed portion of the duct on either side of the trapped device acting as flattened straps to hold the device in place, the device internally entrapped in said globe being in non-projecting relationship thereto whereby the assembly is operable as a ball.*

*12. A globe as set forth in claim 11, wherein said device which is battery-operated includes at least one light bulb energized by the battery.*

* * * * *